(12) United States Patent
McCann (10) Patent No.: US 6,253,141 B1
(45) Date of Patent: Jun. 26, 2001

(54) BRAKING CONTROL SYSTEM FOR VEHICLE

(75) Inventor: Roy A. McCann, Saginaw, MI (US)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 0 days.

(21) Appl. No.: 09/577,277

(22) Filed: May 23, 2000

(51) Int. Cl.$^7$ .............................. B60B 39/00; B60T 7/00
(52) U.S. Cl. .............................. 701/71; 701/70; 701/74; 303/138; 303/142; 477/182
(58) Field of Search .................. 701/70, 71, 42, 701/75, 78, 74; 303/138, 142, 112; 477/182, 186, 187

(56) References Cited

U.S. PATENT DOCUMENTS

| | | |
|---|---|---|
| 4,944,372 | 7/1990 | Taig . |
| 5,024,299 | 6/1991 | Shaw et al. . |
| 5,150,773 | 9/1992 | Hickey et al. . |
| 5,219,048 | 6/1993 | Shaw et al. . |
| 5,366,280 | 11/1994 | Littlejohn . |
| 5,417,485 | 5/1995 | Burgdorf et al. . |
| 5,421,643 | 6/1995 | Kircher et al. . |
| 5,433,512 | 7/1995 | Aoki et al. . |
| 5,472,264 | 12/1995 | Klein et al. . |
| 5,722,744 | 3/1998 | Kupfer et al. . |
| 5,741,048 | 4/1998 | Eccleston . |
| 5,810,454 | 9/1998 | Prinzler et al. . |

*Primary Examiner*—William A. Cuchlinski, Jr.
*Assistant Examiner*—Yonel Beaulieu
(74) *Attorney, Agent, or Firm*—Jacox, Meckstroth & Jenkins (57) ABSTRACT

A controller for an electric brake system in a vehicle. The brake system utilizes switched reluctance electric motors to apply braking force to wheels. Such motors have non-ideal torque-speed characteristics, wherein excessive amounts of time and current are required to change torque delivered. The invention reduces the times, and currents, by adjusting the phase angle, and durations, of current pulses delivered to the coils of the motor. The adjustment is based on several parameters, including presently demanded torque, speed of the electric motor, deviation of vehicle system voltage from a norm, and deviation of motor temperature from a norm.

18 Claims, 9 Drawing Sheets

TYPICAL (NATIVE) TORQUE SPEED LIMIT FOR MOTOR WITHOUT TAU-SIGMA CONTROL (FIXED FIELD VOLTAGE)

FIG-14

IDEAL MOTOR TORQUE SPEED LIMIT

FIG-15

TIME TO REACH FINAL CALIPER POSITION USING TAU-SIGMA CONTROL

TIME TO REACH FINAL CALIPER POSITION WITHOUT TAU-SIGMA CONTROL

BRAKING CONTROL SYSTEM FOR VEHICLE

The invention concerns a control system for optimizing performance of switched reluctance electric motors, when utilized in a braking system in a vehicle.

BACKGROUND OF THE INVENTION

Figure 1:
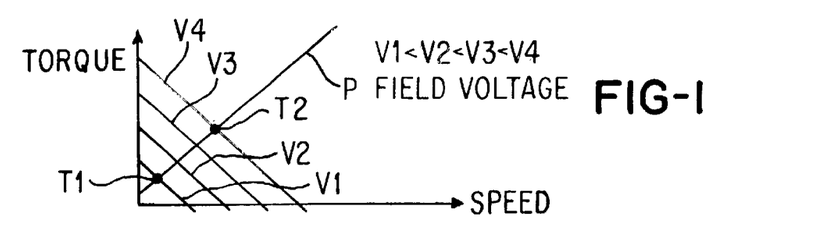
FIG. 1 is a torque-speed diagram for a switched-reluctance motor.

Switched reluctance electric motors have the torque-speed characteristics generally shown in FIG. 1. If torque of the motor is to be increased from T1 to T2, as when increased braking force is to be applied to a wheel of the vehicle, the operating point will generally be constrained to follow path P. However, following this path requires a relatively large amount of time, which is disadvantageous when emergency braking is required. Also, following this path consumes an excessive amount of current, which is not important during emergency braking, but does become significant during normal operation.

SUMMARY OF THE INVENTION

An object of the invention is to provide a control system for a switched reluctance motor, which reduces the time required to change torque, and also reduces current consumed during the change.

In one aspect, this invention comprises an anti-lock braking system comprising an electric motor which applies braking force to a wheel, and means for predicting a future torque which will be demanded of said motor.

In another aspect, this invention comprises an anti-lock braking system comprising an electric motor which applies braking force to a wheel, means for receiving a signal indicative of the amount of presently demanded braking force, means for predicting a future braking force FBF which will be demanded, and means for controlling phase angle and duration of current applied to the electric motor, based on the FBF.

In yet another aspect, this invention comprises a system for use within a vehicle, comprising a switched reluctance electric motor which has native torque-speed curves which require a time T to execute an acceleration from a slow speed S1 to a higher speed S2, and means for reducing the time T.

In still another aspect, this invention comprises a braking system for a vehicle, comprising a switched reluctance electric motor which has native torque-speed curves which slope downward, and applies braking force to a wheel, means for receiving a demanded torque signal produced by a control within the vehicle; and means for causing slope, d(torque)/d(speed), of the native torque-speed curves to become closer to zero.

In yet another aspect, this invention comprises a braking system within a vehicle, comprising a brake controller which accepts input indicative of driver pedal position, lateral acceleration, yaw rate, and rotational speed of each of four wheels, and produces a demanded torque signal for each wheel, a switched reluctance motor for each wheel, which applies braking force to the wheel, a motor controller for each wheel which receives the demanded torque signal for its wheel, computes terms, and utilizes the two terms (tau, sigma) to control phase angle and duration of current within the coils of the switched reluctance motor for the wheel.

In one form of the invention, both the (1) phase angle and (2) duration of current pulses delivered to the coils of a switched reluctance motor are adjusted, based on selected operating conditions of the vehicle, in order to reduce the time required for a change in torque delivered by the motor.

Other objects and advantages of the invention will be apparent from the following description, the accompanying drawings, and the appended claims.

DETAILED DESCRIPTION OF THE INVENTION

Figure 2:
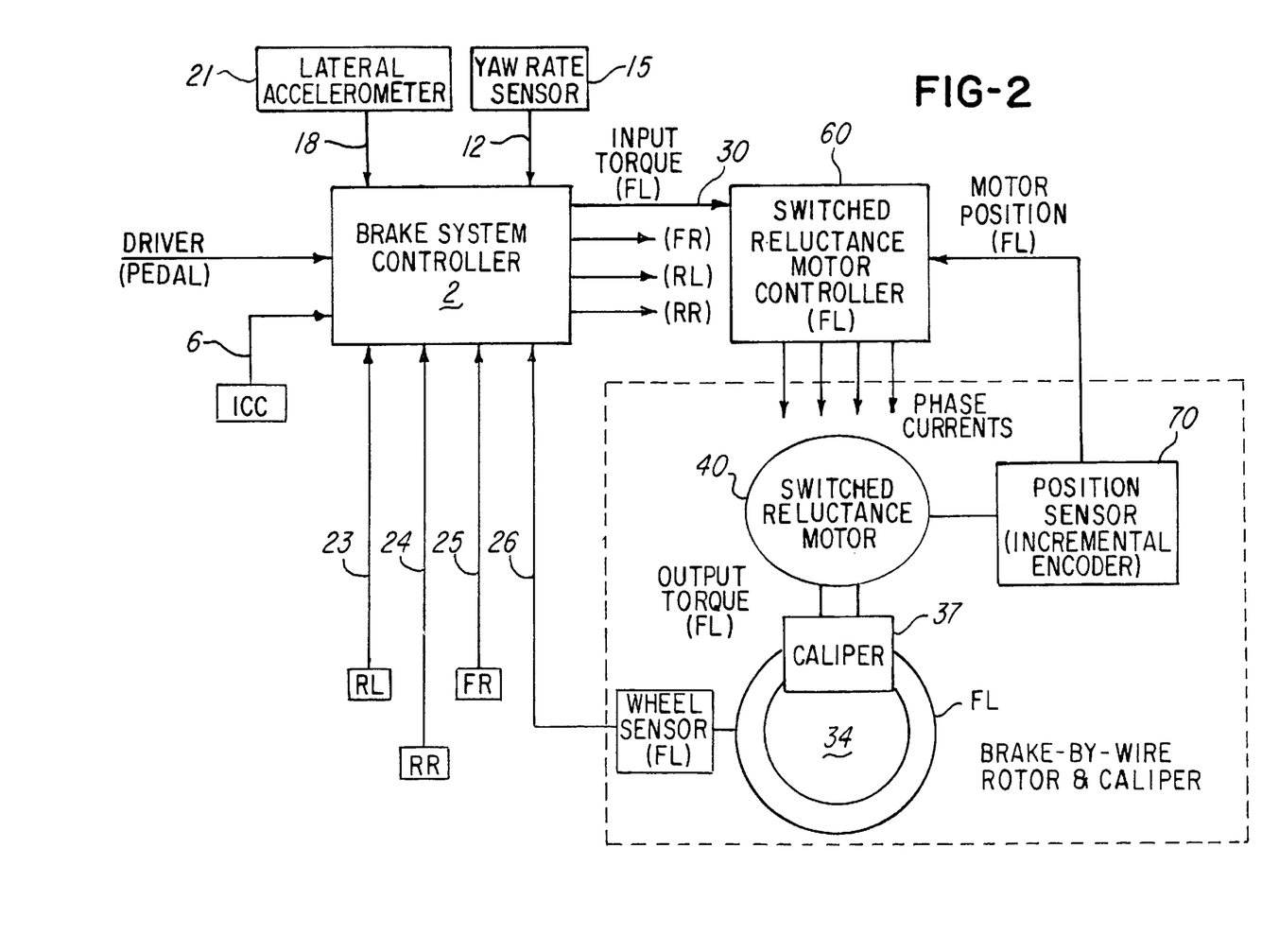
FIGS. 2 and 3 illustrate one form of the invention.

FIG. 2 illustrates a brake control 2, commonly used in Anti-lock Braking systems (ABS). It receives eight inputs:

(1) an indication 3 of position of the driver's brake pedal;

(2) an input 6 which indicates the speed demanded by an Intelligent Cruise Control, ICC;

(3) an input 12 indicative of the rate of yaw of the vehicle, which is produced by a yaw rate sensor 15;

(4) an input 18 indicative of lateral acceleration, which is produced by lateral accelerometer 21 (lateral acceleration is straight-line acceleration perpendicular to the direction in which the vehicle is pointing; yaw is rotation of the vehicle in the horizontal plane);

(5)–(8) inputs 23, 24, 25, and 26 which indicate rotational speed of each wheel.

The wheels are indicated by the symbols RL (Right Left), RR (Right Rear), FR (Front Right) and FL (Front Left).

The control 2 controls each of these wheels in the same manner, so control of the FL (Front Left) wheel will be taken as exemplary of them all.

The control 2 produces a signal 30 which indicates the amount of torque demanded for the FL wheel. More specifically, a brake disc 34 is attached to the wheel FL. A caliper 37 applies braking force to the disc 34. A switched-reluctance motor 40 moves the arms (not separately shown) of the caliper 37, to thereby squeeze the disc 34. The demanded torque in question is that demanded of the switched-reluctance motor 40 in this squeezing process.

Figure 3:
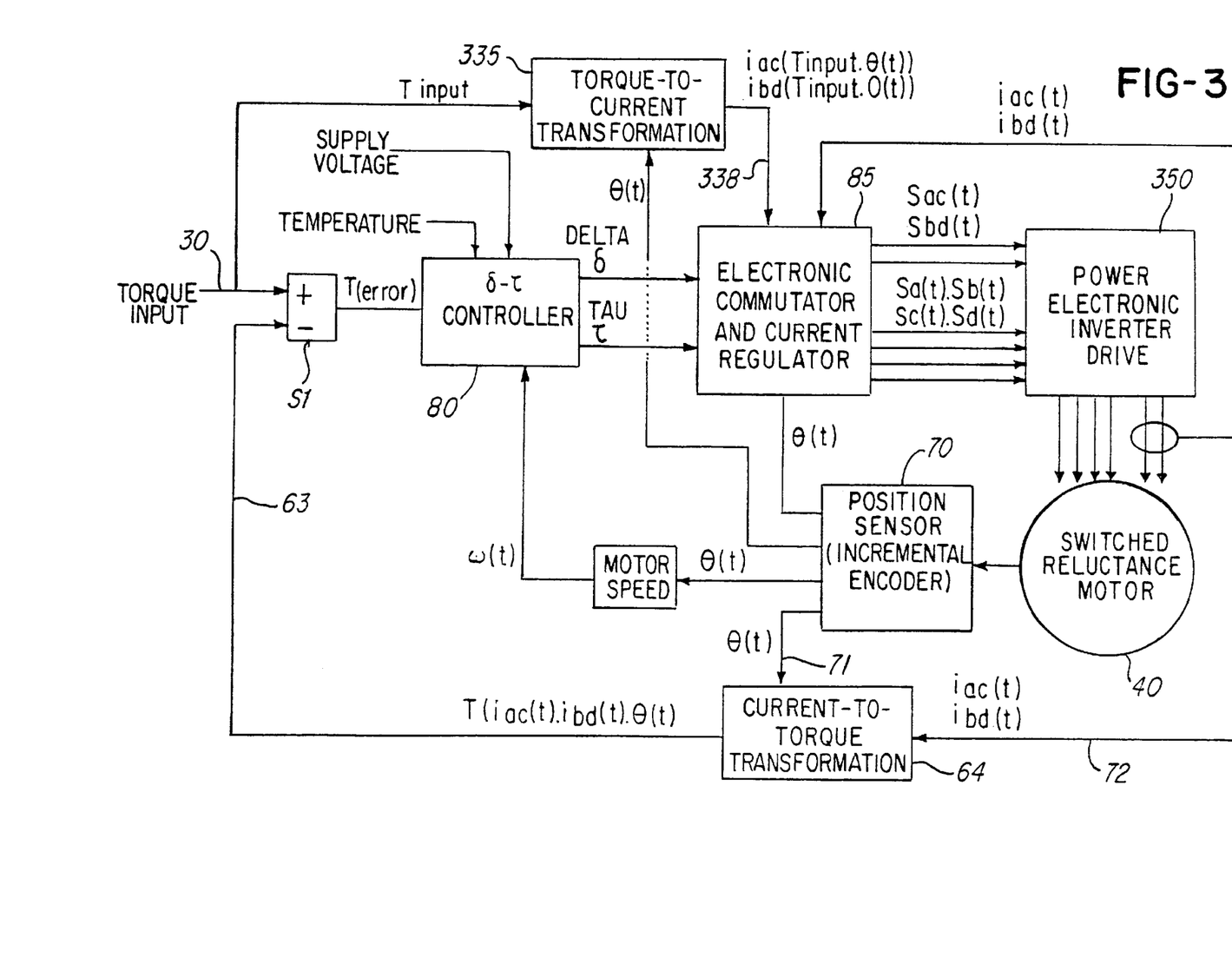

The demanded torque signal is fed to a controller 60, which controls the torque of the motor 40. FIG. 3 illustrates this controller 60 in greater detail. The demanded torque signal 30 of FIG. 2 is fed to a summer S1. That summer S1 also receives a signal 63 indicating the actual torque, presently being produced by the motor 40. The actual-torque signal 63 is produced by block 64.

Block 64 computes the actual-torque signal 63, based on two parameters: (1) angular position, theta, of the shaft (not separately shown) of the switched-reluctance motor 40 and (2) current drawn by selected phases of the motor 40. The angular position, theta, of the shaft is computed by block 70, which represents an incremental shaft encoder (as opposed to an absolute shaft encoder), and is delivered on line 71. Current is measured by an apparatus which is not shown, and is delivered on line 72.

Figure 4:
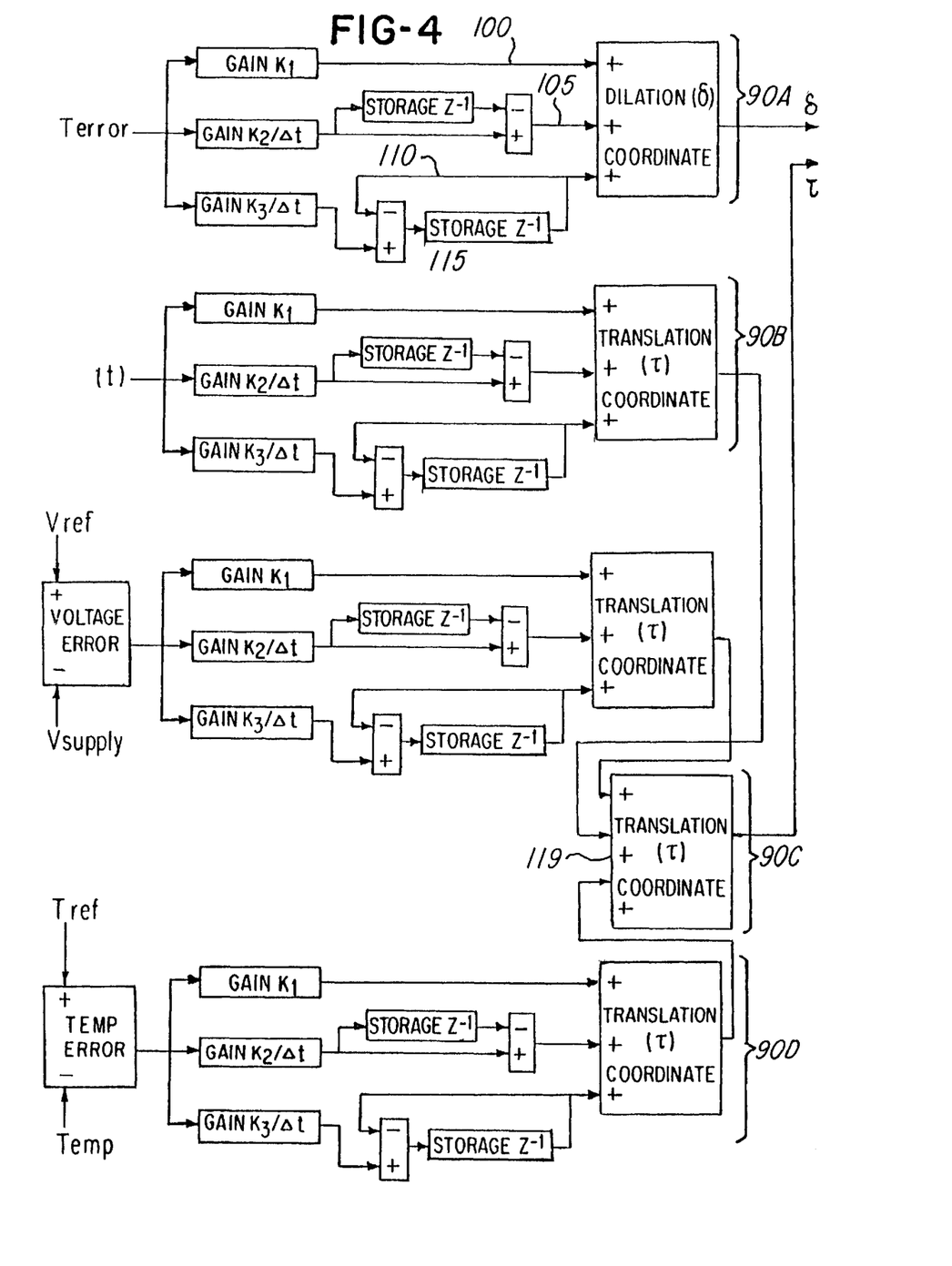
FIG. 4 illustrates block 80 in FIG. 2, in greater detail.

Summer S1 computes a difference T(error) between (1) the demanded torque 30 and (2) the present actual torque. T(error) is fed to block 80, which computes two parameters, sigma and tau, which are utilized by block 85. FIG. 4 shows the detailed computation of delta and tau by block 80.

FIG. 3 shows four computation blocks 90A, 90B, 90C, and 90D, which perform identical computations, but differ in the particular parameters and constants utilized.

Block 90A (as well as the other three blocks 90B, 90C, and 90D) implements a Proportional-Integral-Differential (PID) controller. Line 100 represents the proportional term, and carries a value of T(error) multiplied by gain K1. Line 105 represents the differential term, and carries a value of $$\{[present\ T(error) - last\ T(error)] \times K2\} / DELTA\_T$$

wherein present T(error) is the present torque-error signal;

last T(error) is the previous T(error) signal;

K2 is a constant; and DELTA_T is the time-difference between present T(error) and last T(error), which corresponds to the time delay occurring one iteration of block 90A and a subsequent iteration.

In overview, line represents the difference between present T(error) and the last T(error), divided by a time DELTA_T, which is a rate of change, or derivative. The derivative is scaled by K2.

Line 110 represents the integral term, and carries a value which represents a cumulative integral of the value of T(error). That is, for example, assume a sequence of T(error) signals, labeled T1, T2, T3, T4, T5, and T6. At the beginning of computation, line 110 will carry the signal of T1, because nothing will be stored by storage block 115. Storage block 115 loads that value, T1.

At the next iteration, line 110 will carry T2−T1, and storage block 115 loads that value, T2−T1.

At the next iteration, line 110 will carry T3−(T2−T1), and storage block 115 loads that value, T3−(T2−T1), or, equivalently, T3−T2+T1.

At the next iteration, line 110 will carry T4−(T3−T2+T1, and storage block 115 loads that value, T4−T3+T2−T1).

At the next iteration, line 110 will carry T5−(T4−T3+T2−T1), and storage block 115 loads that value, T5−T4+T3−T2+T1. And so on.

Of course, the preceding was a simplification: the value carried by line 110 is scaled by the factor (K3×DELTA_T).

Therefore, block 90A receives, as input, the T(error) signal, and applies that input signal to a PID controller, to produce a parameter sigma. The other blocks 90B, 90C, and 90D compute the parameter tau.

Bock 90B receives, as input, w(t), which is the angular position of the shaft of motor 40, which is equivalent to motor speed.

Block 90C receives, as input, a voltage error signal. This represents the difference between the actual system voltage, produced by the combination of the vehicle's alternator and battery, and a reference voltage.

Block 90D receives, as input, a temperature error signal, which indicates deviation of actual temperature from a reference temperature. The measured temperature 130 can be any temperature which provides a meaningful indication of the temperature of motor 40. Temperature of the liquid coolant of the vehicle represents one candidate.

Blocks 90B, 90C, and 90D apply these parameters to the respective PID controllers. The outputs of the PID controllers are added in summer 119, which produces parameter tau.

The output of the computation of FIG. 4 are two parameters, delta and tau. These are fed to block 85 in FIG. 3, the details of which are shown in FIG. 5.

Figure 5:
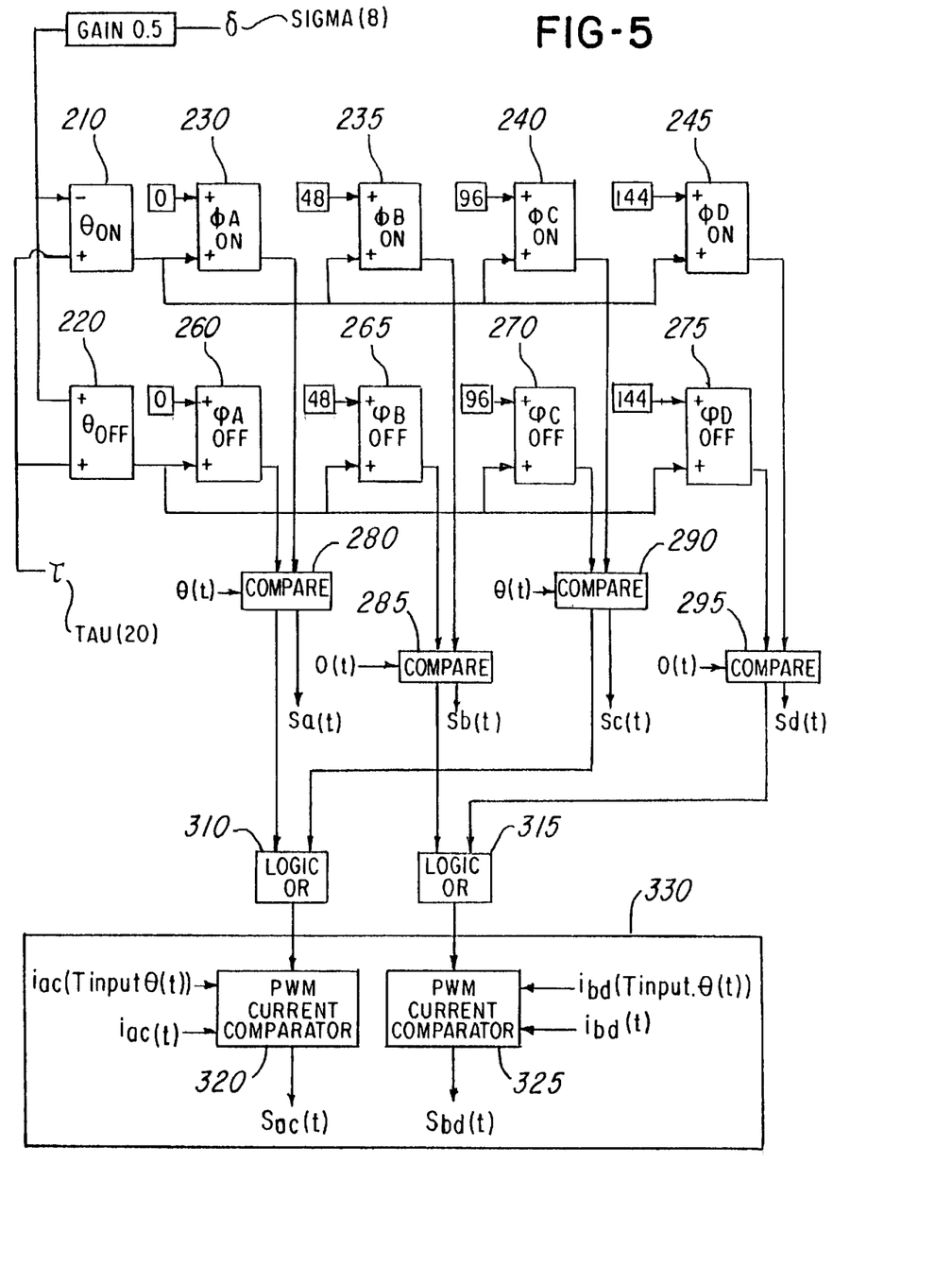
FIG. 5 illustrates block 85 in FIG. 2, in greater detail.

The overall operation of the computation in FIG. 5 is this: the shaft of motor 40 in FIG. 3 continually travels through an angle theta, which runs in degrees from zero to 360, and then repeats. However, the units used in the computation are not degrees, but the units utilized by the shaft encoder 70 in FIG. 3. Forty-eight encoder pulses correspond to 90 electrical degrees. The computation in FIG. 5 controls the timing of the current pulses fed to the phases of the motor 40. For example, assume that delta equals 8 and tau equals 20. The output of summer 210 will be 16 (i.e., 20−0.5×8). The output of summer block 220 will be 24 (i.e., 20+0.5×8).

With these outputs of summer blocks 210 and 220, the outputs of blocks 230, 235, 240 and 245 will be 16, 64, 112, and 160, respectively: the number 16 was added to zero in block 230, to 48 in block 235, to 96 in block 240, and to 144 in block 245. These values will be termed "sigma values."

Similarly, the outputs of blocks 260, 265, 270, and 275 will be 72, 120, 168 and 124, respectively. These values will be termed "rho values."

Each sigma value is paired with a rho value, by the operation of the rank of comparator blocks 280, 285, 290, and 295. Each pair acts as a bracket, or upper-and-lower limit, in a process undertaken by the comparators 280, 285, 290, and 295. Each comparator 280, 285, 290, and 295 inquires whether the present value of theta (i.e., angular shaft position of motor 40) lies within its bracket.

For example, assume shaft position to be 135. The bracket-points for block 280 are 16 and 72. The shaft position does not lie within that bracket. The phase corresponding to variable Sa is not fired.

The bracket-points for block 285 are 64 and 120. The shaft position does not lie within that bracket. The phase corresponding to variable Sb is not fired.

The bracket-points for block 290 are 112 and 168. The shaft position does lie within that bracket. The phase corresponding to variable Sc is now fired.

The bracket-points for block 295 are 160 and 24. The shaft position does not lie within that bracket. The phase corresponding to variable Sd is not fired. Note use of digital or modulo base arithmetic, where 192 is the base (e.g., adding 4 and 190 equals 2).

Therefore, as thus far described, at any given time, a single delta and a single tau are computed, and delivered, to the apparatus represented in FIG. 5. That apparatus derives (1) four variables from delta and tau (the "sigma values") and (2) four values from each delta and tau (the "rho values").

Each sigma value is paired with a specific rho value, and forms a bracket-pair. Each bracket-pair controls the time-of-firing of one phase within the motor 40. The control is accomplished by comparing angular position, theta, with the bracket-pairs. When angular position, theta, enters a bracket, a respective phase fires, and as the angular position leaves the bracket, the phase is de-activated.

Figure 6:
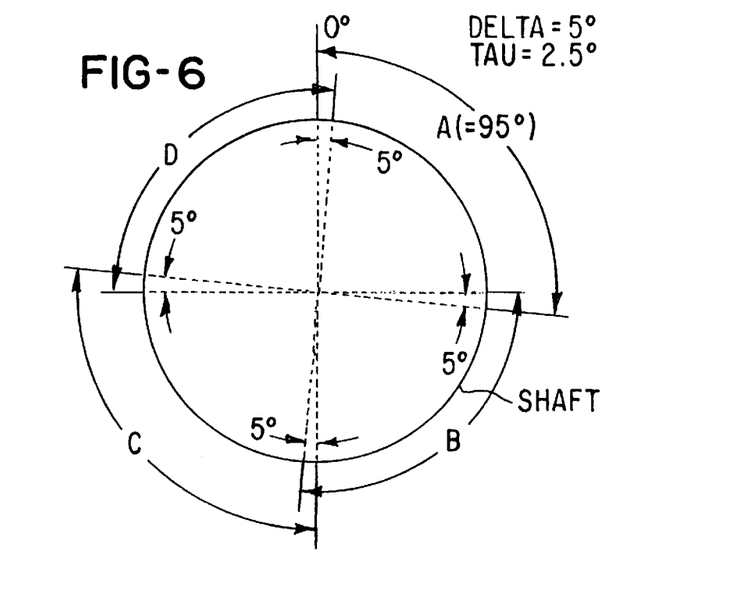
FIGS. 6 and 7 illustrate sectors defined about a SHAFT of motor 40 in FIG. 2. Parameters sigma and tau in FIG. 4 produce these sectors. When the rotational angle of the SHAFT enters one of the sectors, a current is triggered into a corresponding coil within the motor 40.

From another point of view, four sectors, 90 degrees apart, are derived from each delta-tau pair. Tau determines the angular position of the sectors, and delta determines the angular spread of the sectors. FIG. 6 illustrates four such sectors. Sector A runs from zero to 90 degrees; sector B from 90 to 180 degrees; sector C from 180 to 270 degrees, and sector D from 270 to 0 degrees. The units used here are degrees, for ease of explanation.

Figure 7:
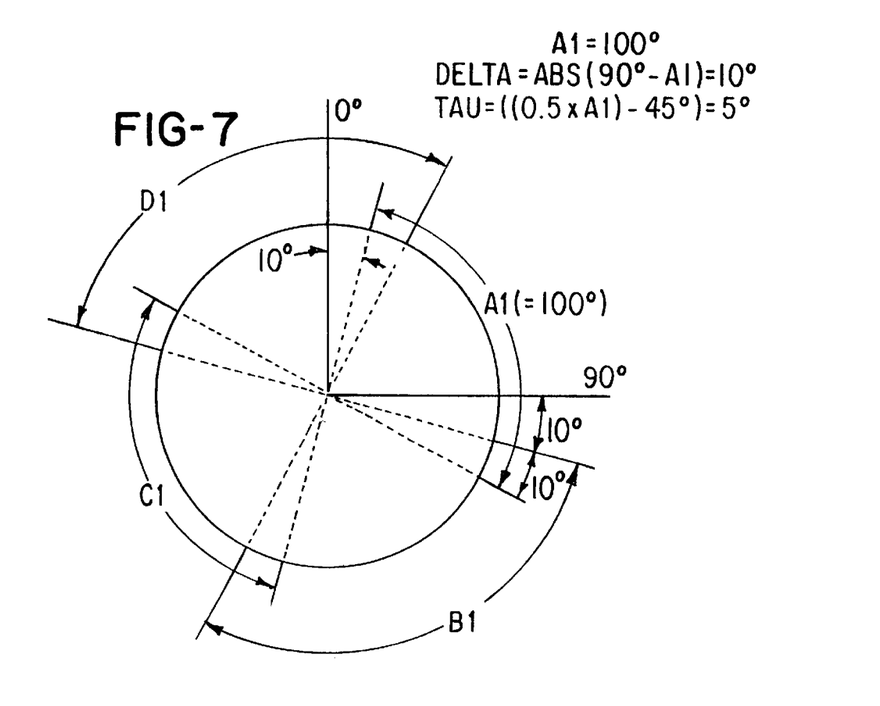

Alteration of delta and sigma allow the sectors to be shifted, as in FIG. 7. There, delta equals 10 degrees, and tau equals 5 degrees. Sectors A1, B1, C1, and D1 illustrate the now-changed sectors. They have moved in position, and increased in angular length.

Each sector controls firing of a respective phase, or coil. When shaft angle enters one sector, a phase activates for the duration that shaft angle remains within the sector. Similar operation occurs for the other phases.

In FIG. 6, firing for sector A initiates at zero degrees, and terminates at 95 degrees. One coil, or phase, A within the motor 40 is fired accordingly. Sectors B, C, and D each control another coil, such as coil B, coil C, and coil D.

In FIG. 7, the firing of coil A has changed: sector A1 now initiates firing at 10 degrees, and terminates it at 110 degrees. The other sectors have also shifted in position, and duration, by five and fifteen degrees in each case.

The rank of comparators 280, 285, 290, and 295 produces a second influence. The comparators can be paired. Those pairs which represent brackets, or sectors, which are 180 degrees apart, cooperate together. That is, comparator 280 cooperates with comparator 290, through OR-gate 310. Comparator 285 cooperates with comparator 295, through OR-gate 315.

The OR-gates enable, or activate, operation of two sub-circuits 320 and 325 within block 330. These blocks 320 and 325 comprise a pulse-width modulation comparator stage, to determine the state of variables Sac and Sbd. This comparator stage is contained within a Texas Instruments model TMS-320C-240 processor, which is commercially available, and described in the Texas Instruments Tutorial Manual for this processor. This processor is utilized to perform the computations of FIGS. 4, and 5.

This comparator stage 330 is also fed the demanded currents, Iac and Ibd, which are produced by block 335 in FIG. 3 and delivered on line 338. These currents represent the demanded torque, but in units of current, as opposed to foot-pounds. The comparator stage 330 is also fed the actual measured currents Iac and Ibd.

Based on these input signals, comparator stage 330 produces signals Sac and Sbd which, together with signals Sa, Sb, Sc, and Sd, are fed to the drive unit 350 in FIG. 3.

The apparatus just described allows one to modify the firing angle, and firing duration, of each coil within motor 40 in FIG. 2. This modification allows one to effectively alter the torque-speed characteristics of the switched-reluctance, brushless, motor.

Every individual block in FIG. 3, with the exception of blocks 80, shown in detail in FIG. 4, and block 85, shown in detail in FIG. 5, is known in the art. However, as stated blocks 80 and 85 are not known in the art, nor is the overall system of FIG. 3.

Figure 8:
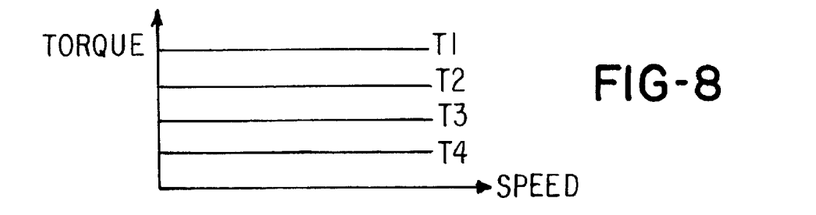
FIG. 8 illustrates an idealized plot of torque-versus-speed.

FIG. 8 illustrates the torque-speed characteristics of an idealized motor. FIG. 1 illustrates the characteristics of an actual switched-reluctance motor, as explained in the Background of the Invention. The "V" symbols refer to field voltage, which indicate field current, which is indicative of torque.

Figure 9:
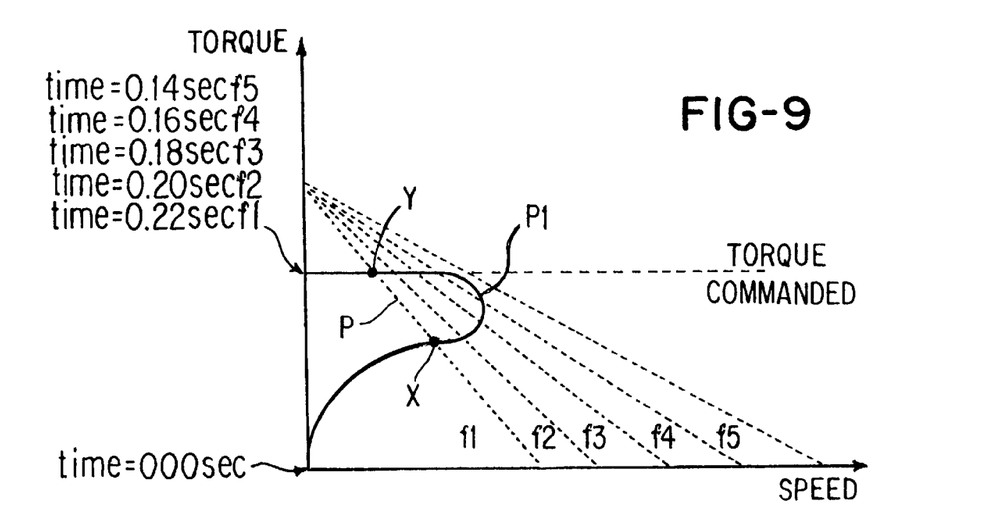
FIG. 9 illustrates two particular excursions along two particular paths, P and P1, taken on the plot of the type shown in FIG. 1.

FIG. 9 is an annotated version of the type of plot in FIG. 1. In FIG. 9, if one wished to make an excursion from operating point X to operating point Y, one may increase field current, and follow path P. However, in practice, it is found that following path P is time-consuming. Also, a large field current is required.

The invention allows one to follow path P1, by adjusting tau and sigma appropriately, to thereby adjust the positions of the sectors, shown in FIGS. 6 and 7, wherein the respective coils fire. That is, the invention allows one to alter the native curves, shown in FIGS. 1 and 9, which are inherent in the switched reluctance motor, to the idealized curves shown in FIG. 8.

Figure 10:
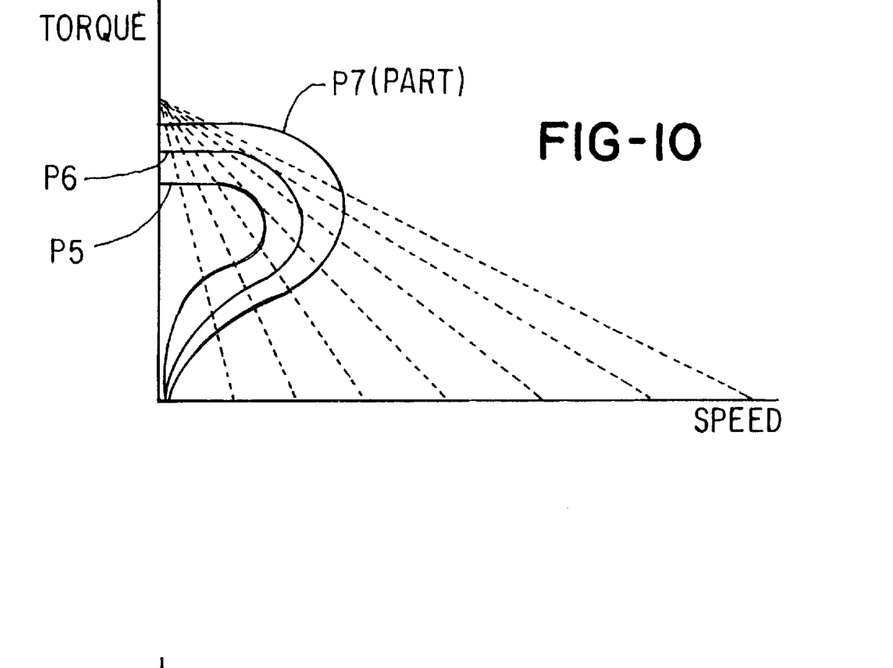
FIG. 10 illustrates a family of plots P5–P7, of the type shown in FIG. 9.
Figure 11:
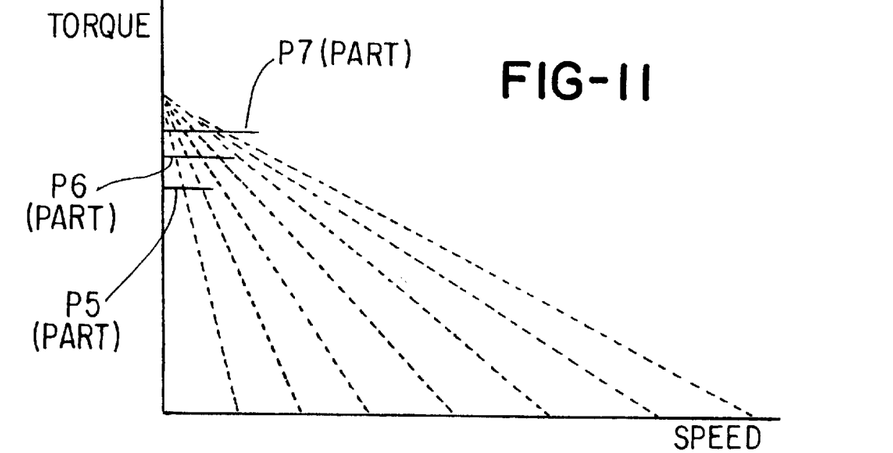
FIG. 11 illustrates how parts of the plots of FIG. 10, taken together, form the idealized plots of FIG. 8.

To explain this, the Inventor points out that Pi in FIG. 9 is a generalized path. A family of such paths P5–P7 is shown in FIG. 10. If one considers only parts of those paths shown in Figure, then it is clear that the invention causes an ordinary switched-reluctance motor, having the torque-speed curves shown in FIG. 1, to exhibit the more idealized torque-speed curves of FIG. 8, as FIG. 11 indicates. Appropriate selection of sigma and tau can stretch out the plots shown in FIG. 11, so that they resemble those in FIG. 1.

These idealized torque plots, which are substantially horizontal when torque is plotted as a function of speed, are attainable by selection of appropriate sequences of tau and sigma, which are the parameters shown in FIG. 4.

Prediction of Demanded Torque

Figure 12:
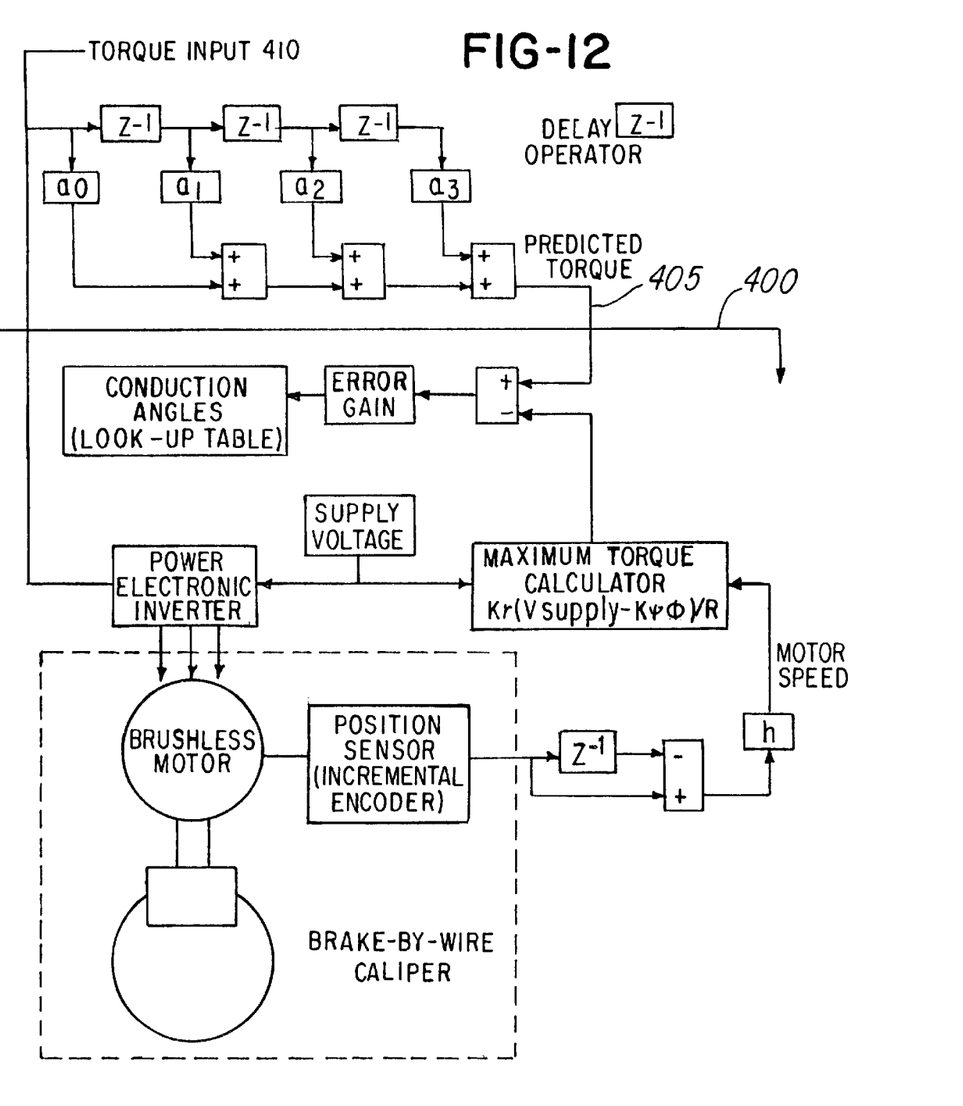
FIG. 12 illustrates another form of the invention.

The control system of FIG. 3 utilized presently demanded torque as an input parameter. FIG. 12 illustrates a system in which presently demanded torque is, in effect, replaced by a predicted future torque.

The components below double arrows 400 represent a standardized control system for motor-driven brakes. FIGS. 2 and 3 represent one system which can be used.

However, in FIGS. 2 and 3, presently demanded torque is the input. In contrast, in FIG. 12, a future, predicted torque demand is utilized as an input. That is, the predicted torque signal on line 405 in FIG. 12 replaces the torque input 30 in FIG. 3. The predicted torque signal 405 in FIG. 12 is derived from the present torque demand signal 410, which is produced by the brake controller 2 in FIG. 2.

Restated, the brake controller 2 produces a presently demanded torque signal on line 30. That signal 30 is fed to line 410 in FIG. 12. Predicted torque 405 is produced, and is fed as the positive input to summer S1 in FIG. 3.

The computation represented by the components above double arrow 400 in FIG. 12 produces the predicted torque demand. In a simple case, the predicted torque is a linear extrapolation of previous torque demanded. An example of this extrapolation is obtained by setting parameters a2 and a3 in FIG. 12 to zero. That done, if a0 is set to 2, and a1 set to negative 1, then the computation becomes:

predicted TD=2(present TD)−previous TD wherein
  TD is torque demanded,
  present TD is the torque presently demanded by the control system 2 in FIG. 2, and
  previous TD is the torque demanded by the control system 2 during the last iteration.

This predictive approach introduces a type of time-shifting. That is, presently computed tau and sigma, which control firing angle and duration, become computed based on anticipated torque demand.

Additional Considerations

1. The plots of FIG. 1 refer to a "native" switched reluctance motor. The term "native" refers to the motor operated in its switched-reluctance mode, wherein speed is controlled by the timing of the pulses applied to the motor, and torque is controlled by the current applied in those pulses.

The invention allows the motor to attain a given transient in torque, such as that indicated by plot P1 in FIG. 9. This approach provides two primary benefits. One is that the time of the transient is reduced, compared with path P. A second is that current consumed by the motor is reduced, also compared with path P.

Figure 13:
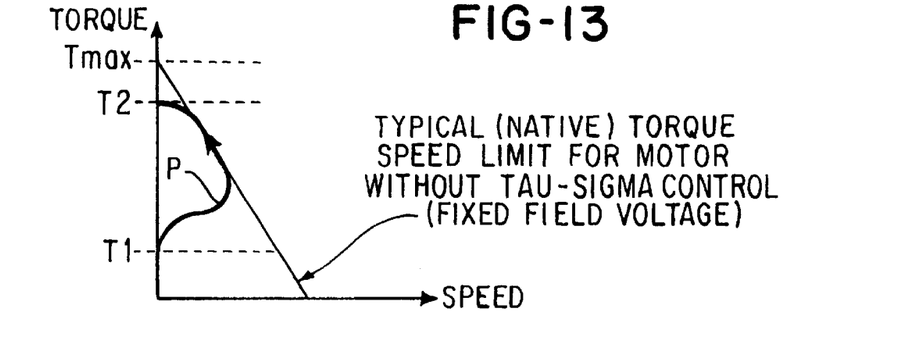
FIG. 13 illustrates a limit which a prior-art system encounters.

2. FIG. 1 is an idealized plot. FIG. 13 illustrates a real-world limit which motor speed encounters, in the absence of the tau-sigma control strategy of the invention, that is, with a fixed field voltage. Path P shows a torque excursion from T1 to T2, using a prior-art system, and the limit which is encountered.

Figure 14:
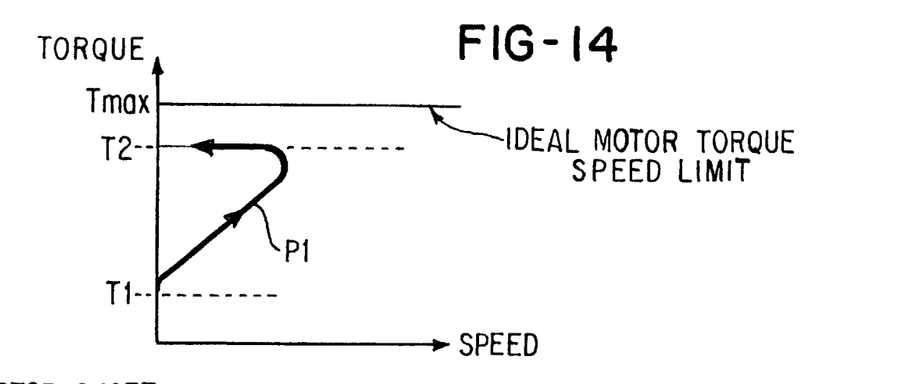
FIG. 14 illustrates a path P1 which the invention is able to take, which avoids the limit of FIG. 13.

FIG. 14 illustrates a path P1 which torque may take by use of the invention. Path P1 is superimposed over a plot of the type shown in FIG. 8, and shows a torque excursion from T1 to T2, using one form of the invention.

Figure 15:
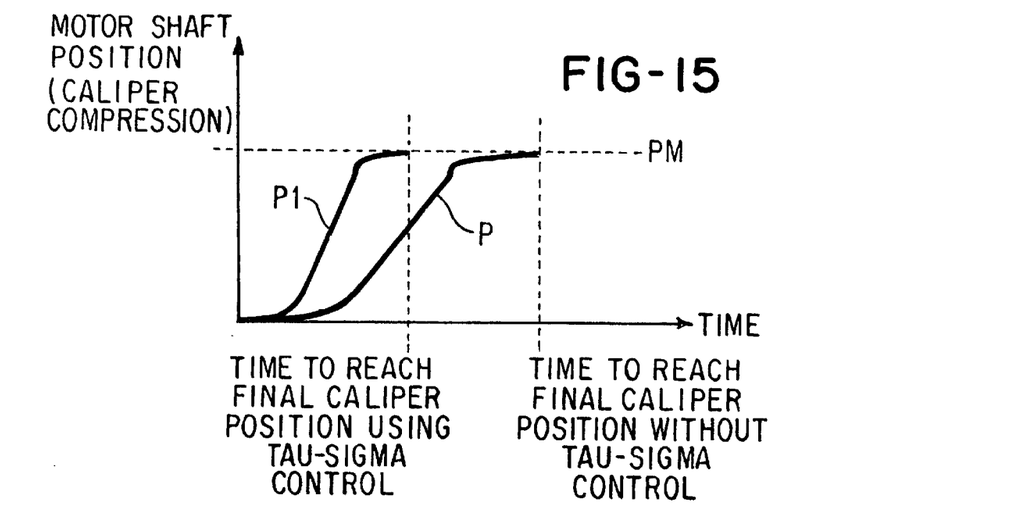
FIG. 15 compares the time required by the prior art system of FIG. 13 to reach a given motor shaft position with the corresponding time required by one form of the invention, which follows path P1 in FIG. 14.

FIG. 15 compares the times taken by the excursions P and P1 of FIGS. 13 and 14, in order to reach a given motor shaft position PM, which corresponds to a given amount of caliper compression, which corresponds to a given amount of braking torque. Using one form of the invention, path P1 requires a shorter time to reach position PM, compared with path P.

While the methods herein described, and the forms of apparatus for carrying these methods into effect, constitute preferred embodiments of this invention, it is to be understood that the invention is not limited to these precise methods and forms of apparatus, and that changes may be made in either without departing from the scope of the invention, which is defined in the appended claims.

What is claimed is:

1. In an anti-lock braking system, the improvement comprising:
    a) an electric motor which applies braking force to a wheel; and
    b) means for predicting a future torque which will be demanded of said motor.

2. The improvement according to claim 1, and further comprising:
    c) means for using the predicted future torque to compute parameters which cause the motor to deliver a present torque.

3. The improvement according to claim 1, wherein said means uses a torque signal to predict said future torque.

4. The improvement according to claim 2, wherein said means comprises a maximum torque calculator.

5. In an anti-lock braking system, the improvement comprising:
    a) an electric motor which applies braking force to a wheel;
    b) means for receiving a signal indicative of the amount of presently demanded braking force;
    c) means for predicting a future braking force FBF which will be demanded; and
    d) means for controlling phase angle and duration of current applied to the electric motor, based on the future braking force FBF.

6. The improvement according to claim 5, wherein said means for receiving comprises a control which produces said presently demanded braking force.

7. The improvement according to claim 5, wherein said means for predicting utilizes a look-up table for predicting said future braking force FBF.

8. The improvement according to claim 5, wherein said means for controlling comprises a power electronic inverter.

9. The improvement according to claim 5, wherein the electric motor is of the switched-reluctance type.

10. A braking system for use within a vehicle comprising:
    a) a switched reluctance electric motor which has native torque-speed curves which require a time T to execute an acceleration from a slow speed S1 to a higher speed S2; and
    b) means for reducing the time T.

11. The system according to claim 10, wherein the motor consumes a current I during time T, and further comprising:
    c) means for reducing said current I.

12. A braking system for a vehicle, comprising:
    a) a switched reluctance electric motor which
        i) has native torque-speed curves which slope downward, and
        ii) applies braking force to a wheel;
    b) means for receiving a demanded torque signal produced by a control within the vehicle; and
    c) means for causing slope, t(torque)/d(speed), of the native torque-speed curves to become closer to zero.

13. A braking system within a vehicle, comprising:
    a) a brake controller which accepts input indicative of
        i) driver pedal position,
        ii) lateral acceleration,
        iii) yaw rate, and
        iv) rotational speed of each of four wheels,
        and produces a demanded torque signal for each wheel;
    b) a switched reluctance motor for each wheel, which applies braking force to the wheel;
    c) a motor controller for each wheel which
        i) receives the demanded torque signal for its wheel,
        ii) computes terms, and
        iii) utilizes the two terms (tau, sigma) to control phase angle and duration of current within the coils of the switched reluctance motor for the wheel.

14. The system according to claim 13 and further comprising:
    d) four proportional-integral-derivative, PID, controllers, within the motor controller, wherein;
        i) one of said PID controllers
            A) receives an error signal representing the difference between said demanded torque signal and presently produced torque signal, and
            B) produces the term (sigma) in response;
        ii) a second of said PID controllers
            A) receives a signal indicating present speed of said motor; and
            B) produces a first intermediate variable in response;
        iii) a third of said PID controllers
            A) receives an indication of error in vehicle system voltage, and
            B) produces a second intermediate variable in response;
        iv) a fourth of said PID controllers
            A) receives an indication of deviation of temperature of a predetermined component, and
            B) produces a third intermediate variable in response;

e) a summer which sums the first, second, and third intermediate variables, to produce the term (tau) in response.

15. A braking system for use within a vehicle comprising:

a) a switched reluctance electric motor which has native torque-speed curves which require a time T to execute an acceleration from a slow speed S1 to a higher speed S2; and b) a circuit for reducing the time T.

16. The system according to claim 15, wherein the motor consumes a current I during time T, and further comprising:

c) at least one circuit for reducing said current I.

17. The system according to claim 12, wherein said means for receiving is a generated reluctance motor controller.

18. A braking system for a vehicle, comprising:

a) a switched reluctance electric motor which i) has native torque-speed curves which slope downward, and ii) applies braking force to a wheel;

b) a switched reluctance motor controller for receiving a demanded torque signal produced by a control within the vehicle; and c) a circuit for causing slope, t(torque)/d(speed), of the native torque-speed to become closer to zero.

\* \* \* \* \*